United States Patent
Sebastian

(10) Patent No.: US 7,086,692 B2
(45) Date of Patent: Aug. 8, 2006

(54) WHEEL HOUSE SHELL FOR A MOTOR VEHICLE

(75) Inventor: Bernd Sebastian, Renningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 44 days.

(21) Appl. No.: 10/999,952

(22) Filed: Dec. 1, 2004

(65) Prior Publication Data

US 2005/0116508 A1 Jun. 2, 2005

(30) Foreign Application Priority Data

Dec. 2, 2003 (DE) ................. 103 56 238

(51) Int. Cl.
*B06J 7/00* (2006.01)

(52) U.S. Cl. ..................... 296/198; 296/208

(58) Field of Classification Search ............... 296/198, 296/208; 180/68.1
See application file for complete search history.

(56) References Cited

U.S. PATENT DOCUMENTS

| | | | | |
|---|---|---|---|---|
| 2,952,423 A | * | 9/1960 | Ellis ........................... 244/12.2 |
| 4,131,308 A | * | 12/1978 | Holka et al. ............. 296/180.5 |
| 4,372,570 A | * | 2/1983 | Goodall ....................... 280/851 |
| 4,549,762 A | * | 10/1985 | Burk et al. ................ 180/68.1 |
| 4,673,206 A | * | 6/1987 | Kretschmer et al. ..... 296/180.1 |
| 4,687,217 A | * | 8/1987 | Stewart ....................... 296/198 |
| 4,690,204 A | * | 9/1987 | Reichel et al. ............. 180/68.1 |
| 4,969,421 A | * | 11/1990 | Haner et al. ............. 123/41.49 |
| 4,992,071 A | * | 2/1991 | Suto ............................ 446/457 |
| 5,184,832 A | * | 2/1993 | Miwa ......................... 296/198 |
| 5,462,331 A | * | 10/1995 | Stief et al. .................. 296/198 |
| 5,626,185 A | * | 5/1997 | Gielda et al. .............. 180/68.1 |
| 5,820,203 A | * | 10/1998 | Morelli et al. ............. 296/198 |
| 6,033,010 A | * | 3/2000 | Preiss ......................... 296/208 |
| 6,354,003 B1 | * | 3/2002 | Lehmann et al. ........... 296/208 |
| 6,712,425 B1 | * | 3/2004 | Brulhart ..................... 296/198 |
| 6,799,782 B1 | * | 10/2004 | Jain et al. ................... 280/848 |
| 2004/0080185 A1 | * | 4/2004 | Loddo ........................ 296/198 |

FOREIGN PATENT DOCUMENTS

| | | |
|---|---|---|
| DE | 297829 | 5/1930 |
| DE | 10159783 | 6/2003 |
| JP | 59-184067 | 10/1984 |
| JP | 2004-338602 | 12/2004 |

* cited by examiner

*Primary Examiner*—Kiran B. Patel
(74) *Attorney, Agent, or Firm*—Crowell & Moring LLP

(57) ABSTRACT

A wheel house shell is adapted to and mounted on the contour of a motor vehicle wheel house and is provided with an air outlet opening having ribs or gills. A deflector is provided in front of the cool air outlet opening, as seen in the direction of rotation of the wheel, so that particles thrown directly from the wheel and sliding along the wheel house shell wall are guided laterally around rather than the cool air outlet opening.

9 Claims, 2 Drawing Sheets

WHEEL HOUSE SHELL FOR A MOTOR VEHICLE

BACKGROUND OF THE INVENTION

This application claims the priority of DE 10356238.9, filed Dec. 2, 2003, the disclosure of which is expressly incorporated by reference herein.

The present invention relates to a wheel house shell for a motor vehicle which is essentially adapted to and mounted on the contour of the wheel house, with a cool air outlet opening having ribs or gills provided locally on the wheel house shell.

In normal driving operations, rotating wheels on a vehicle stir up a large quantity of particles such as rocks, dirt, snow, water or the like. Some of these particles are thrown to the rear, but some are also conveyed into the wheel house, where they are thrown tangentially along the wheel house shell wall in the direction of rotation of the wheel. Due to the high kinetic energy of the particles, they continue to slide along the wheel house shell wall, drop down again or enter structural openings in the wheel house shell. These are designed as cool air outlet openings, for example, and partially cover sensitive components in the form of ribs or gills, such as fan blades, fan motors, control units, cooler networks or the like behind them.

The type of protection is selected primarily according to thermodynamic and aerodynamic considerations so that admission of particles frequently cannot be prevented to an adequate extent. The situation becomes particularly critical when incoming particles cannot escape in the long run, because there are no additional openings toward the bottom. The space behind the ribs or gills thus becomes more and more clogged with particles. The result for these components is an impairment of function (fan noises, fan imbalance, loss of efficiency, etc.) and/or in the long run possibly a complete failure due to mechanical damage or corrosion.

SUMMARY OF THE INVENTION

An object of the present invention is to configure the wheel house shell of a motor vehicle such that penetration of particles into the cool air outlet openings is reliably prevented without altering the shape or position of the ribs or gills to maintain the full thermodynamic and aerodynamic efficiency.

This object has been achieved by providing that a deflector in front of the cool air outlet opening, as seen in the direction of rotation of the wheel, on the side of the wheel house shell wall facing the wheel, so that the particles which fly directly off of the wheel and slide along the wheel house shell wall are deflected laterally around the cool air outlet opening.

The main advantages achieved with this invention can be seen to include reliably preventing the penetration of particles into the cool air outlet opening without changing the shape and position of the ribs/gills. This advantage is accomplished by providing a deflector upstream from the cool air outlet opening on the wheel house shell wall which faces the wheel. Particles flying directly away from the wheel and sliding along the wheel house shell wall are captured by a narrow roof-shaped deflector with an upstream drain channel above the ribs or gills and then are deflected to the side. The particles therefore cannot enter the cool air outlet openings. The drain channels of the deflector are turned inward into the wheel house shell and then protrude only slightly into the wheel house so the wheel clearance is maintained. The deflector is also designed to be elastic.

BRIEF DESCRIPTION OF THE DRAWINGS

Other objects, advantages and novel features of the present invention will become apparent from the following detailed description of the invention when considered in conjunction with the accompanying drawings, in which.

DETAILED DESCRIPTION OF THE DRAWINGS

Figure 1:
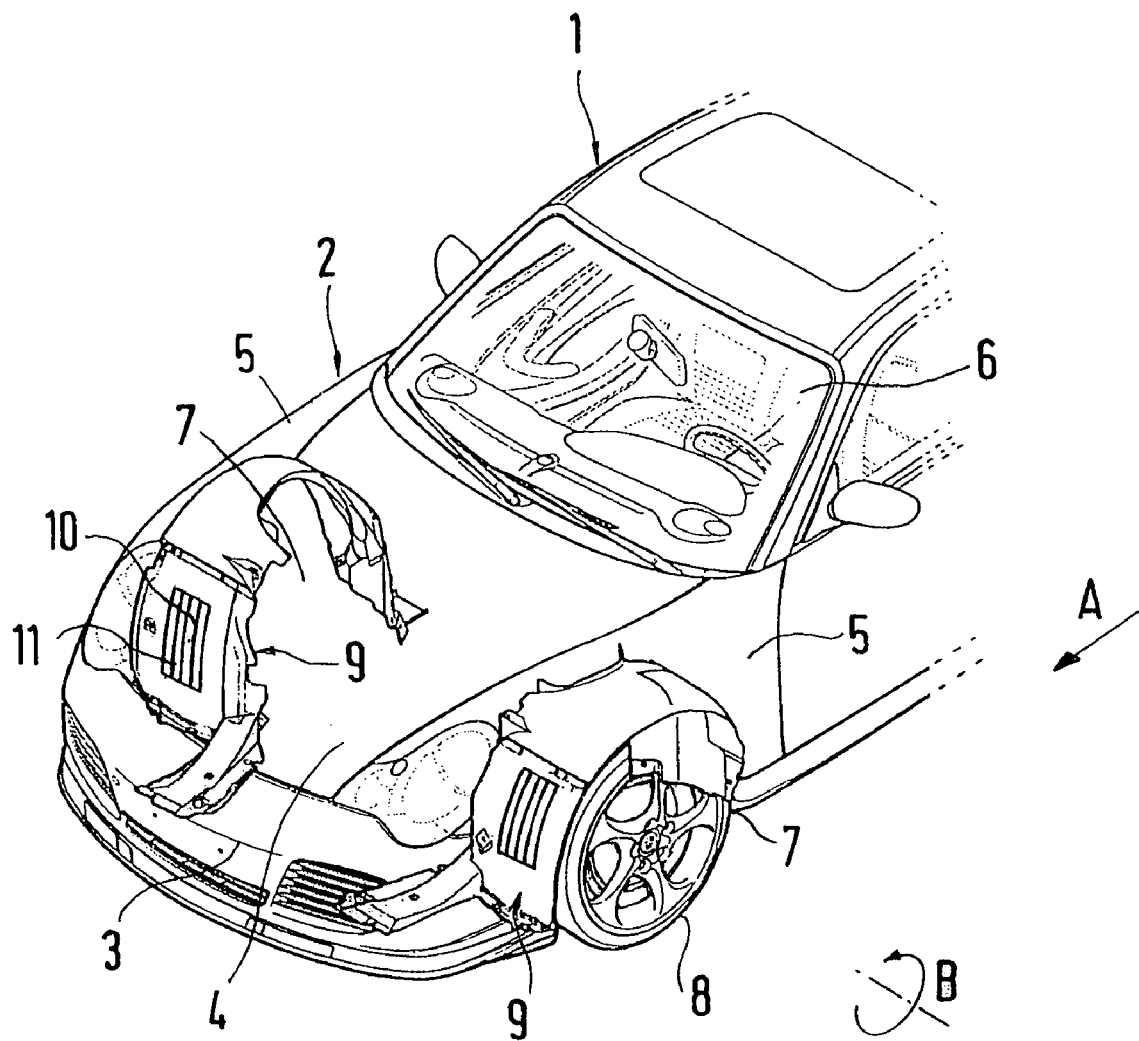
FIG. 1 is a perspective partial view of a motor vehicle which has wheel house shells mounted in the area of the wheel houses, as seen from above.
Figure 2:
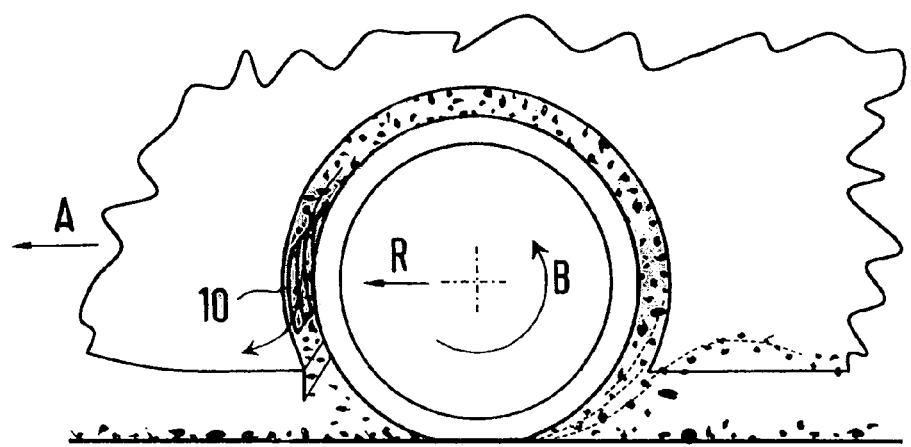
FIG. 2 is a side view of the front wheel house showing the wheel house shell inserted.

The motor vehicle 1, which is a passenger vehicle here, has a body 2, which includes in the area shown here a front end part 3, a front hood 4, side parts 5 and a windshield 6. The wheel houses 7 are provided in the area of the side parts 5, accommodating the wheels 8. A wheel house shell 9, preferably made of one or more plastic parts, is inserted into each wheel house 7 and secured there. A cool air outlet opening 10 which is provided on each wheel house shell 9 in a lower area toward the front, as seen in the direction of travel A, has a plurality of ribs or gills 11, preferably configured to extend vertically. Heated or cool air is directed into the wheel house 7 and/or toward the side of the vehicle through cool air outlet opening 10. The ribs or gills 11 are shaped accordingly for this purpose.

In order for components such as fan blades, fan motors, control units or the like, which are located behind the cool air outlet opening 10, not to be damaged due to particles thrown around in the wheel house 7, a deflector 12 is provided on the wheel house shell wall 13 in front of the cool air outlet opening 10, as seen in the direction of wheel rotation B, so that particles thrown directly from the wheel 8 and sliding along the wheel house shell wall 13 slide laterally around the cool air outlet opening 10.

Figure 3:
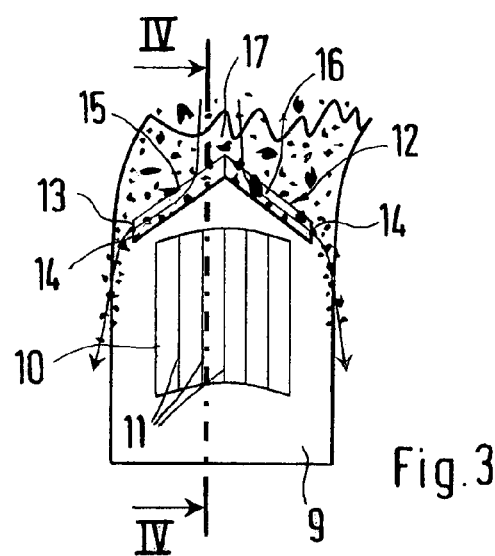
FIG. 3 is a partial view in the direction of arrow R of FIG. 2 showing the wheel house shell according to the present invention.
Figure 4:
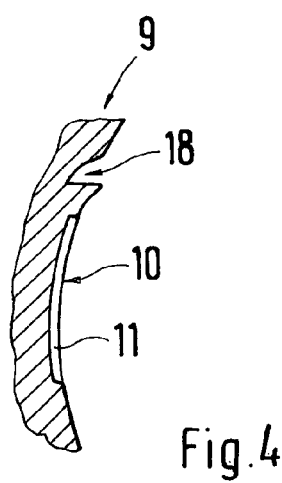
FIG. 4 is a sectional view along line IV—IV in FIG. 3.

According to FIG. 3, the deflector 12 is designed with a rooftop shape, whereby the free ends 14 of the two legs 15, 16 of the deflector 12 protrude beyond the cool air outlet opening 10, as seen in the transverse direction, and the tip 17 of the deflector 12 is at a higher level than the free ends 14 of the legs 15, 16. The two legs 15, 16 of the roof-shaped deflector 12 are configured as drain channels 18 arranged to be countersunk in the illustrated embodiment. The drain channels 18 are U-shaped, V-shaped or the like, as seen in cross section in FIG. 4. The wheel clearance is retained due to the countersunk configuration.

The deflector 12 can also be configured so as to be elevated, i.e., the deflector 12 protrudes slightly in comparison with the contour of the wheel house shell wall 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Wheel house shell for a motor vehicle which is adapted essentially to the contour of the wheel house and to be mounted thereon, comprising a cool air outlet opening having ribs or gills provided locally on the wheel house shell, and a deflector in front of the cool air outlet opening, as seen in a direction of wheel rotation, on a side of the wheel house shell wall facing an associated wheel, so that particles which fly directly off of the wheel and slide along the wheel house shell wall are deflected laterally around the cool air outlet opening.

2. Wheel house shell as claimed in claim 1, where the deflector has a rooftop shape arranged above the cool air outlet opening.

3. Wheel house shell as claimed in claim 2, wherein two legs of the roof-shaped deflector protrude beyond the cool air outlet opening, as seen in a vehicle transverse direction.

4. Wheel house shell as claimed in claim 2, wherein two legs of the deflector running obliquely together form a countersink drain channel, each drain channel having a U-shaped, a V-shaped or a similar profile as seen in cross section.

5. Wheel house shell as claimed in claim 4, wherein two legs of the roof-shaped deflector protrude beyond the cool air outlet opening, as seen in a vehicle transverse direction.

6. Wheel house shell as claimed in claim 1, wherein the deflector elevated on the wheel house shell wall.

7. Wheel house shell as claimed in claim 6, where the deflector has a rooftop shape arranged above the cool air outlet opening.

8. Wheel house shell as claimed in claim 7, wherein two legs of the roof-shaped deflector protrude beyond the cool air outlet opening, as seen in a vehicle transverse direction.

9. Wheel house shell as claimed in claim 8, wherein two legs of the deflector running obliquely together form a countersink drain channel, each drain channel having a U-shaped, a V-shaped or a similar profile as seen in cross section.

* * * * *